United States Patent [19]

Itoh et al.

[11] Patent Number: 4,533,687

[45] Date of Patent: Aug. 6, 1985

[54] FLAME-RETARDANT RUBBER COMPOSITION

[75] Inventors: Kunio Itoh; Toshimichi Oshima; Tsutomu Nakamura, all of Gunma, Japan

[73] Assignee: Shin-Etsu Chemical Co., Ltd., Tokyo, Japan

[21] Appl. No.: 575,504

[22] Filed: Jan. 31, 1984

[30] Foreign Application Priority Data

Jan. 31, 1983 [JP] Japan .................................. 58-14458

[51] Int. Cl.$^3$ ............................ C08K 3/02; C08K 3/22
[52] U.S. Cl. ...................................... 524/80; 524/264; 524/269; 524/414; 524/436; 524/437; 524/506; 525/100; 525/106
[58] Field of Search .................. 524/80, 264, 269, 414, 524/436, 437, 506; 525/100, 106

[56] References Cited

U.S. PATENT DOCUMENTS 4,265,801  5/1981  Moody et al. ...................... 525/106

FOREIGN PATENT DOCUMENTS 0138044  10/1979  Japan ...................................... 524/80
6093207   7/1981  Japan ...................................... 524/80

*Primary Examiner*—John Kight
*Assistant Examiner*—Kriellion Morgan
*Attorney, Agent, or Firm*—Toren, McGeady, Stanger, Goldberg & Kiel

[57] ABSTRACT

The invention provides a highly flame-retardant polyolefin-based rubber composition free from the problem of the formation of toxic or corrosive gases and a large volume of smoke by burning of conventional flame-retardant rubber compositions impregnated with a large amount of a halogen-containing flame retardant agent. The inventive rubber composition comprises (a) a synthetic rubber of polyolefin type, (b) an organopolysiloxane resin which is preferably formed of monofunctional siloxane units and tetrafunctional siloxane units in a molar ratio of 0.6/1.0 to 2.0/1.0, (c) red phosphorus and (d) aluminum hydroxide or magnesium hydroxide in a specified proportion.

3 Claims, No Drawings

FLAME-RETARDANT RUBBER COMPOSITION

BACKGROUND OF THE INVENTION

The present invention relates to a novel flame-retardant rubber composition or, more particularly, to a rubber composition mainly composed of a polyolefin-based synthetic rubber imparted with remarkably improved flame retardancy.

As is well known, synthetic rubbers of the polyolefin type are generally excellent in the electric and mechanical properties so that they are widely used as a material for electric insulation. On the other hand, polyolefin-based synthetic rubber compositions are defective in their combustion behavior since they are highly inflammable and, once they have taken fire, the fire rapidly propagates with dripping of the molten rubber composition. Therefore, the fields of their application are greatly limited in this regard to those where flame retardancy is not essential and it has been eagerly desired to develop a novel polyolefin-based rubber composition with high flame retardancy.

The flame retardancy of a polyolefin-based rubber composition can be improved by incorporating a flame retardant agent into the rubber composition and the most conventional flame retardant agents are various kinds of halogen-containing organic compounds and antimony oxide or combinations thereof. These flame retardant agents are practically not quite satisfactory because sufficiently high flame retardancy can be obtained only by incorporating a considerably large amount of the agent accompanied by an economical disadvantage due to the expensiveness of these flame retardant agents. In addition, these flame retardant agents are not acceptable from the standpoint of human health and environmental pollution because large volumes of toxic or corrosive gases and smoke are produced when a rubber composition impregnated with these flame retardant agents is set on fire.

Various attempts have been made for improving the flame retardancy of the polyolefin-based rubber compositions by incorporating other inorganic compounds into the rubber composition. Unfortunately, none of them is so effective as to impart sufficiently high flame retardancy with a relatively small amount while a polyolefin-based synthetic rubber composition impregnated with a large amount of such an inorganic compound can no longer exhibit the excellent electrical and mechanical properties inherent to the rubber compositions of this class.

Alternatively, various kinds of phosphorus-containing compounds are proposed as a flame retardant agent but incorporation of a large amount of such a flame retardant agent into a rubber composition causes a problem of blooming of the compound on the surface of the rubber article in addition to the decrease in the electric properties.

Thus, no satisfactory solution has been found in this problem of improving the flame retardancy of a polyolefin-based rubber composition.

SUMMARY OF THE INVENTION

An object of the present invention is therefore to provide a novel and improved polyolefin-based synthetic rubber composition imparted with markedly improved flame retardancy without the above described disadvantages and problems in the prior art rubber compositions.

The highly flame-retardant polyolefin-based rubber composition of the present invention comprises:

(a) 100 parts by weight of a synthetic rubber of polyolefin type;

(b) from 1 to 50 parts by weight of an organopolysiloxane resin;

(c) from 1 to 20 parts by weight of red phosphorus; and (d) from 5 to 200 parts by weight of aluminum hydroxide or magnesium hydroxide.

The above mentioned organopolysiloxane resin is preferably formed by comprising the monofunctional triorganosiloxy units and the tetravalent siloxane units of the formula $SiO_2$.

DETAILED DESCRIPTION OF THE PREFERRED EMBODIMENTS

As is understood from the above description, the effect of flame retardancy in the inventive composition is obtained by the combination of the essential components (b), (c) and (d) and the effectiveness of this system is so high that the inventive rubber composition is imparted with flame retardancy comparable to or exceeding the flame retardancy in a similar rubber composition impregnated with a large amount of a halogen-containing compound as a flame retardant agent. The absence of a halogen-containing compound ensures that burning of the inventive rubber composition never produces toxic or corrosive gases and the volume of smoke produced in the combustion of the inventive composition is also very small. In addition to such outstanding flame retardancy, the inventive rubber composition retains the excellent electrical and mechanical properties inherent to the plyolefin-based synthetic rubbers.

By virtue of the above described advantages, the inventive rubber composition is very useful as a material for the insulation of electric wires and as a material for the insulating parts in various kinds of electric appliances and instruments for industrial and household uses and vehicles and parts of which non-corrosiveness is essential.

In the following, detailed description is given for each of the essential components comprised in the inventive rubber composition.

The component (a) is a synthetic rubber of polyolefin type and any one of the synthetic rubbers belonging to this calss can be formulated according to the present invention. Exemplary of such a synthetic rubber are, for example, copolymers of ethylene and propylene, terpolymers of ethylene, propylene and a diene, copolymers of ethylene and vinyl acetate, copolymers of ethylene and methyl acrylate, copolymers of ethylene and ethyl acrylate and the like. These synthetic rubbers can be used either singly or as a rubber blend of two kinds or more according to need. Rubbers of other types may also be blended if not in a large amount.

Furthermore, the inventive system of flame retardant agent is also applicable to a heat-shrinkable rubber composition composed of a polyolefin-based synthetic rubber and a thermoplastic resin such as polyethylene, polypropylene, polybutylene, polypentene, copolymers of ethylene and butene, certain silicone resins having no or little reactivity and the like. Conventional heat-shrinkable rubber compositions formulated with these thermoplastic resins have a trend of dripping by burning but such a disadvantageous phenomenon is completely prevented by the admixture of the components (b), (c) and (d) according to the invention.

The component (b) in the inventive rubber composition is an organopolysiloxane resin which itself is well known in the art of silicones. Any resinous organopolysiloxanes can be used as the component (b) having a branched molecular structure. Organopolysiloxanes are generally composed by a combination of monofunctional organosiloxane units of the formula $R_3SiO_{0.5}$ (hereinafter referred to as M units), difunctional organosiloxane units of the formula $R_2SiO$ (hereinafter referred to as D units), trifunctional organosiloxane units of the formula $RSiO_{1.5}$ (hereinafter referred to as T units) and tetrafunctional siloxane units of the formula $SiO_2$ (hereinafter referred to as Q units), R being a hydrogen atom or an organic group defined below, and an organopolysiloxane containing a substantial proportion of the T or Q units has a branched molecular structure and is resinous.

The organic group denoted by R in the above given formulas of the siloxane units is exemplified by alkyl groups such as methyl, ethyl, propyl and butyl groups, aryl groups such as phenyl groups, alkenyl groups such as vinyl and allyl groups, cyclopentadienyl group, 3-methacryloxypropyl group, mercaptopropyl group, 3-glycidyloxypropyl group and the like hydrocarbon groups and substituted groups thereof. When the organopolysiloxane is composed of a substantial amount of the T or Q units, some of the functionalities may be satisfied with hydroxy groups or hydrolyzable groups such as alkoxy groups and these groups are effective for forming a linkage between the organopolysiloxane molecules and the surface of the component (d) or particles of a reinforcing filler such as finely divided silica formulated according to need by adsorption or reaction so that these particulate ingredients are imparted with increased dispersibility and hydrophobicity.

The organopolysiloxane resin as the component (b) in the inventive rubber composition is solid or viscous liquid at room temperature. The organopolysiloxane is readily prepared by a known method in which one or a combination of the tri- or tetrafunctional hydrolyzable silanes such as methyl trichlorosilane, methyl trimethoxysilane, phenyl trichlorosilane, phenyl trimethoxysilane, vinyl trichlorosilane, sodium silicate and the like are co-hydrolyzed as combined with one or more of the mono- or difunctional hydrolyzable silanes such as dimethyl dichlorosilane, dimethyl dimethoxysilane, methyl vinyl dichlorosilane, trimethyl chlorsilane and the like followed, if necessary, by polymerization after removal of the acid formed by the hydrolysis.

As is mentioned before, the organopolysiloxane resin as the components (b) in the inventive rubber composition should preferably be composed mainly of the M and Q units, optionally, combined with small amounts of the D and T units. The molar ratio of the M units to the Q units should be in the range from 0.6 to 2.0 or, preferably, from 0.7 to 1.2.

Although sufficient flame retardancy can be obtained in the inventive rubber composition even when all of the organic groups in the organopolysiloxane resin are alkyl, e.g. methyl, groups, it should be noted that further improved results of flame retardancy can be obtained when the organopolysiloxane resin contains substantial amounts of functional groups reactive with the polyolefin-based synthetic rubber as the component (a) such as hydrogen atoms directly bonded to the silicon atoms, vinyl groups, allyl groups, acrylic groups, methacrylic groups, mercaptopropyl groups and the like. When the organopolysiloxane resin contains two or more of these reactive groups per molecule, crosslinks are formed with the polyolefin-based synthetic rubber so that the effect of flame retardancy is further enhanced. Introduction of phenyl groups into the organopolysiloxane resin is also effective to improve the properties of the rubber composition including flame retardancy as a result of the increased compatibility of the resin with the synthetic rubber.

When vulcanization of the inventive rubber composition is intended by use of an organic peroxide as the vulcanizing agent, it is particularly preferable that the organopolysiloxane resin contains aliphatically unsaturated reactive groups such as vinyl and allyl. When the vulcanization of the rubber composition is effected with sulfur or a sulfur compound as the vulcanizing agent, on the other hand, it is preferable that the organopolysiloxane resin contains mercapto groups. When the organopolysiloxane resin contains silicon-bonded hydrogen atoms, they may serve as a crosslinking agent by the addition reaction with the aliphatically unsaturated bonds in the polyolefin-based synthetic rubber as the component (a) with promotion by an organic peroxide or a platinum catalyst.

In order to reduce the necessary amount of this organopolysiloxane resin in the inventive rubber composition from the standpoint of economy and improvement of the properties of the rubber, the organopolysiloxane resin should have dispersibility as high as possible in the component (a) with good compatibility so that the resin should preferably contain pheyl, 2-phenylethyl, 2-phenylpropyl and the like aromatic groups. It is also desirable from the standpoint of dispersibility that the molecular weight of the organopolysiloxane resin is not excessively large. For example, the degree of polymerization, i.e. the number of silicon atoms in a molecule, should preferably be 100 or smaller.

Several of the examples of a preferable organopolysiloxane resin effective even in a relatively small amount of addition include those composed of a combination of the T units such as $CH_3SiO_{1.5}$, $C_6H_5SiO_{1.5}$, $CH_2=CHSiO_{1.5}$ and the like and a combination of the Q units and one or more kinds of the M units such as $(CH_3)_3SiO_{0.5}$, $(CH_2=CH)(CH_3)_2SiO_{0.5}$ and the like with a molar proportion of M/Q as mentioned above. The organopolysiloxane resins composed of the M and Q units are preferable because the mechanical properties of vulcanizates of the rubber composition are little affected by the incorporation of the resin of this class while the flame retardancy is greatly improved thereby.

The amount of the component (b) in the inventive rubber composition should be in the range from 1 to 50 parts by weight per 100 parts by weight of the polyolefin-based synthetic rubber as the component (a) since no sufficient improvement in the flame retardancy can be obtained with the component (b) in a smaller amount than above while an excessively large amount of this component is detrimental to the physical properties of the resultant rubber composition. When compatibility is desired between the mechanical properties and the improvement in the flame retardancy, the amount of the component (b) should preferably be in the range from 2 to 30 parts by weight per 100 parts by weight of the component (a).

The component (c) is red phosphorus and commercially available products of powdery red phosphorus as such may be used. It is preferable, however, in consideration of the dispersibillity in the synthetic rubber that the powdery red phosphorus is coated in advance with a synthetic resin such as phenolic resins. Such a surface-treated red phosphorus product is available on the market under various tradenames.

The amount of this component (c) in the inventive rubber composition should be in the range from 1 to 20 parts by weight per 100 parts by weight of the olefin-based synthetic rubber as the component (a). When the amount of the component (c) is smaller than above, no sufficient improvement can be obtained in the flame retardancy of the rubber composition while a rubber composition impregnated with red phosphorus in excess of 20 parts by weight may be poor in the electrical properties as well as in the mechanical properties as a rubber vulcanizate.

The component (d) formulated in the inventive rubber composition is aluminum hydroxide $Al(OH)_3$ or magnesium hydroxide $Mg(OH)_2$. These hydroxides are conventionally used as a flame retardancy improver in various kinds of organic polymer products. In the inventive rubber composition, on the contrary, no sufficient flame retardancy can be obtained by the incorporation of these hydroxides alone as a flame retardancy improver. In the polyolefin-based synthetic rubber compositions, in particular, these hydroxides are insufficiently effective even to impart self-extinguishability which is obtained only by the incorporation of a greatly increased amount of the hydroxide to cause a loss of the practical value with decreased physical properties of the rubber composition.

The amount of this component (d) in the inventive rubber composition should be in the range from 5 to 200 parts by weight or, preferably, from 20 to 100 parts by weight per 100 parts by weight of the pololefin-based synthetic rubber as the component (a). No sufficient improvement can be obtained in the flame retardancy with the component (d) in a smaller amount than above while incorporation of the component (d) in a larger amount than above may result in practically unacceptable mechanical properties of the rubber composition along with remarkable decrease in the electrical properties.

The rubber composition of the invention can be admixed optionally with various kinds of rubber additives and processing aids according to need including reinforcing fillers, non-reinforcing fillers, pigments, vulcanizing agents, vulcanization accelerators, aging retarders, antioxidants, ultraviolet absorbers, mold release agent, softeners, processing oils, various kinds of carbon-functional organosilanes and the like. It is further optional that the inventive rubber composition is admixed with known flame retardant agents with an object to obtain an auxiliary effect of flame retardancy improvement including halogen-containing compounds, phosphates, esters of phosphoric acid, borates, antimony oxide, graphite and the like although the amount thereof should be limited not to cause any adverse effects unavoidable with these conventional flame retardancy improvers.

The vulcanization of the inventive rubber composition can be effected in several different ways depending on the types of the components (a) and (b). Suitable vulcanizing agent is selected from organic peroxides, sulfur and sulfur compounds. Irradiation with a high-energy radiation such as electron beams and gamma rays is also applicable to cause vulcanization of the inventive rubber composition.

The organic peroxides suitable as a vulcanizing agent are exemplified by dicumyl peroxide, di-tert-butyl peroxide, tertbutyl cumyl peroxide, 2,5-dimethyl-2,5-di(-tert-butylperoxy)hexyne-3, 1,1-bis(tert-butylperoxy)-3,3,5-trimethyl cyclohexane and the like. The sulfur compounds suitable as a vulcanizing agent include dipentamethylenethiuram tetrasulfide.

The inventive rubber composition can be prepared by uniformly blending and kneading a mixture composed of the above described components (a) to (d) together with other optional additives by use of a suitable rubber blending machine such as a Banbury mixer, kneader, two-roller mill and the like. This rubber milling work can be performed at an elevated temperature although care should be taken to avoid premature decomposition of the vulcanizing agent by adding it after the temperature of the rubber composition under milling has decreased below the decomosition temperature of the vulcanizing agent.

The rubber composition of the present invention can be shaped by any conventional rubber processing techniques including compression molding, extrusion, calendering and the like. A liquid coating composition can be prepared by dispersing the inventive rubber composition in an organic solvent.

In the following, examples are given to illustrate the invention in more detail. In the examples, the amounts given in parts all refer to parts by weight.

EXAMPLE 1

Rubber compositions of five different formulations were prepared by uniformly compounding the materials characterized below in a proportion indicated in Table 1 by use of a pressurizable kneader and each of them was shaped and vulcanized into a sheet of 2 mm thickness in a press at 150° C. for 10 minutes under a pressure of 100 kg/cm$^2$ followed by heating at 150° C. for 2 hours.

EPDM: an EPDM rubber having an iodine value of 6 and a Mooney viscosity of $ML_{1+4}(100°\ C.)=40$ (EP 43, a product by Nippon EP Rubber Co.);

Siloxane resin: an organopolysiloxane resin composed of the siloxane units of $(CH_3)_3SiO_{0.5}$, $(CH_3)_2(CH_2=CH)SiO_{0.5}$ and $SiO_2$, of which the molar ratio of the former two types of the siloxane units to the $SiO_2$ units was 0.7/1.0 and the content of the vinyl groups was 3% by weight;

Siloxane gum: a diorganopolysiloxane having a degree of polymerization of about 6000 and composed of 99.5% by moles of $(CH_3)_2SiO$ units and 0.5% by moles of $(CH_3)(CH_2=CH)SiO$ units;

Red phosphorus: a surface-treated red phosphorus containing 85% by weight of phosphorus (Novared #120, a product by Rin Kagaku Kogyo Co.); and Aluminum hydroxide: a commercial product (Heidilite H42M, a product by Showa Keikinzoku Co.).

Each of the thus prepared rubber sheets was subjected to the evaluation of the flame retardancy according to the oxygen index method specified in ASTM D 2863 and the testing method by vertical burning specified in the UL specifications to give the results shown in Table 1 together with the results of the observation of dripping.

EXAMPLE 2

Rubber compositions of five different formulations were prepared by uniformly blending in a two-roller mill 100 parts of an EPDM rubber (EPT-3045, a product by Mitsui Sekiyu Kagaku Co.), 10 parts of red phosphorus (Novared #120UF, a product by Rin Kagaku Kogyo Co.), 5 parts of a precipitated silica filler having a specific surface area of 230 m$^2$/g (Nipsil VN3, a product by Nippon Sun Sekiyu Co.) and 2.8 parts of dicumyl peroxide together with or without an organopolysiloxane resin named Siloxane resin-1, -2 or -3 as characterized below in an amount indicated in Table 2. Each of the rubber compositions was shaped and vulcanized into a rubber sheet in the same conditions as in Example 1.

TABLE 1

| | Experiment No. | 1 | 2 | 3 | 4 | 5 |
|---|---|---|---|---|---|---|
| Formulation | EPDM, parts | 100 | 100 | 100 | 100 | 100 |
| | Siloxane resin, parts | — | — | — | 10 | — |
| | Siloxane gum, parts | — | — | — | — | 10 |
| | Red phosphorus, parts | 10 | — | 10 | 10 | 10 |
| | Aluminum hydroxide, parts | — | 100 | 100 | 100 | 100 |
| | Dicumyl peroxide, parts | 2.8 | 2.8 | 2.8 | 2.8 | 2.8 |
| Flame retardancy | Oxygen index | 19.3 | 22.8 | 26.8 | 30.0 | 28.0 |
| | Test by UL specification | inflammable | inflammable | 94V-1 failed | 94V-0 passed | 94V-1 passed |
| | Dripping | Yes | Yes | Yes | No | No |

Siloxane resin-1: an organopolysiloxane composed of the siloxane units of $R_3SiO_{0.5}$, R being a methyl or vinyl group, and the $SiO_2$ units, of which the molar ratio of $R_3SiO_{0.5}/SiO_2$ was 0.7/1.0 and the molar ratio of vinyl/methyl was 1/2;

Siloxane resin-2: an organopolysiloxane composed of $CH_3SiO_{1.5}$ units and $C_6H_5SiO_{1.5}$ units of which the molar ratio of phenyl/methyl was 3/7; and Siloxane resin-3: an organopolysiloxane composed of the siloxane units of $CH_3SiO_{1.5}$ alone.

Each of the thus prepared rubber sheets was subjected to the determination of the specific gravity, hardness, tensile strength and ultimate elongation and evaluation of the flame retardancy to give the results shown in Table 2.

EXAMPLE 3

Rubber compositions were prepared each by uniformly blending in a pressurizable kneader 100 parts of an EPDM rubber (EP 22, a product by Nippon EP Rubber Co.), 10 parts of an organopolysiloxane resin composed of the $(CH_3)_2(CH_2=CH)SiO_{0.5}$ units, $(CH_3)_3SiO_{0.5}$ units and $SiO_2$ units, of which the molar ratio of the former two types of the siloxane units to the $SiO_2$ units was 0.7/1.0, 8 parts of a fumed silica filler (Aerosil 200, a product by Nippon Aerosil Co.), 100 parts of the same aluminum hydroxide as used in Example 1, 1.5 parts of the same aging retarder as used in Example 2, 15 parts of the same process oil as used in Example 2, 3 parts of a dimethylpolysiloxane terminated at both molecular chain ends each with a hydroxy group and 10 parts of the same red phosphorus as used in Example 2 followed by the further admixture of 1.3 parts of tert-butyl cumyl peroxide (Experiment No. 11) or a combination of 0.65 part of sulfur, 0.22 part of 2-mercapto benzothiazole and 0.65 part of tetramethyl-thiuram monosulfide (Experiment No. 12) each per 100 parts of the rubber blend.

TABLE 2

| | Experiment No. | 6 | 7 | 8 | 9 | 10 |
|---|---|---|---|---|---|---|
| Formulation, parts | Siloxane resin-1 | 5 | 10 | — | — | — |
| | Siloxane resin-2 | — | — | 10 | — | — |
| | Siloxane resin-3 | — | — | — | 12 | — |
| Properties | Specific gravity at 25° C. | 1.29 | 1.29 | 1.29 | 1.29 | 1.30 |
| | Hardness, JIS | 63 | 63 | 61 | 60 | 65 |
| | Tensile strength, kg/cm$^2$ | 95 | 92 | 73 | 68 | 95 |
| | Ultimate elongation, % | 390 | 420 | 490 | 450 | 400 |
| | Test by UL specification | 94V-O | 94V-O | 94V-O | 94V-O | inflammable |
| | Dripping | No | No | No | No | Yes |

Each of the rubber compositions was shaped and vulcanized in the same conditions as in Example 1 into a rubber sheet of which various properties including the flame retardancy were determined to give the results shown in Table 3.

TABLE 3

| Experiment No. | 11 | 12 |
|---|---|---|
| Specific gravity at 25° C. | 1.29 | 1.29 |
| Hardness, JIS | 60 | 62 |
| Tensile strength, kg/cm$^2$ | 80 | 72 |
| Ultimate elongation, % | 600 | 550 |
| Tear strength, A, kg/cm | 26 | 25 |
| Elastic resilience, % | 55 | 56 |
| Permanent compression set, %, 105° C./22 hours | 13 | 50 |
| Volume resistivity, ohm · cm | $3.4 \times 10^{15}$ | $1.9 \times 10^{15}$ |
| Breakdown voltage, kV/mm | 31.7 | 30.0 |
| Test by UL specification, 2 mm | UL94V-0 | UL94V-0 |
| Dripping | No | No |

EXAMPLE 4

Three rubber compositions were prepared each by uniformly blending in a two-roller mill 100 parts of a copolymer of ethylene and vinyl acetate (Evathrene 420-P, a product by Dai-Nippon Ink Kagaku Co.), 50 parts of magnesium hydroxide (Magnesium Hydroxide 200, a product by Kamishima Kagaku Co.), 50 parts of the same aluminum hydroxide as used in Example 1, 0.5 part of 2,6-di-tert-butyl-4-methyl phenol and 2.8 parts of dicumyl peroxide without or with further admixture of 5 parts of red phosphorus and 10 pars of an organopolysiloxane resin composed of the $(CH_3)_2(CH_2=CH)SiO_{0.5}$ units and the $SiO_2$ units, of which the molar ratio of the former units to the latter was 0.7/1.0.

Each of the rubber compositions was shaped and vulcanized into a rubber sheet in the same conditions as in Example 1 and subjected to the evaluation of the flame retardancy to give the results shown in Table 4.

EXAMPLE 5

Two rubber compositions were prepared each by uniformly blending the components shown in Table 5 in the proportion also shown in the table in a two-roller mill followed by shaping and vulcanization into a rubber sheet in the same conditions as in Example 1. The characterization of each of the components in Table 5 is as follows.

TABLE 4

|  | Experiment No. | 13 | 14 | 15 |
|---|---|---|---|---|
| Formulation | Organopolysiloxane resin | Yes | No | Yes |
|  | Red phosphorus | Yes | Yes | No |
| Flame retardancy | Oxygen index | 30 | 26 | 26 |
|  | Test by UL specification | 94V-0 | inflammable | inflammable |
|  | Dripping | No | Yes | No |

EPDM: an EPDM rubber EPT 3045, a product by Mitsui Sekiyu Kagaku Co.;

Aluminum hydroxide: the same one as used in Example 1;

Silica filler: a precipitated silica filler Ultrasil VN3, a product by DEGUSSA Co.;

Process oil: a naphthyne-type process oil Sonic Process R-1000, a product by Kyodo Sekiyu Co.; and Aging retarder: 2-mercaptobenzimidazole Nocrack MB, a product by Ouchi-Shinko Kagaku Co.

Each of the thus prepared rubber sheets was subjected to the determination of the mechanical properties and evaluation of the flame retardancy to give the results shown in Table 5.

In this table, the value of "transmission" in % is given as a measure of the smoke-producing characteristic of the rubber determined according to the procedure specified in JIS D1201, in which the determination was performed in a stream of a 70:30 by volume mixture of nitrogen adn oxygen flowing at a rate of 11.4 liters/minute.

TABLE 5

|  | Experiment No. | 16 | 17 |
|---|---|---|---|
| Formulation, parts | EPDM | 100 | 100 |
|  | Aluminum hydroxide | 100 | 100 |
|  | Silica filler | 5 | 5 |
|  | Process oil | 15 | 15 |
|  | Aging retarder | 1 | 1 |
|  | Organopolysiloxane resin | 10 | 5 |
|  | Red phosphorus | 5 | — |
|  | Decabromodiphenyl ether | — | 40 |
|  | Antimony trioxide | — | 20 |
|  | Dicumyl peroxide | 2.8 | 2.8 |
| Properties | Hardness, JIS | 63 | 65 |
|  | Tensile strength, kg/cm$^2$ | 95 | 65 |
|  | Ultimate elongation, % | 410 | 350 |
|  | Oxygen index | 28 | 27 |
|  | Test by UL specification | 94V-0 | 94V-0 |
|  | Transmission, % | 65 | 0.8 |

What is claimed is:

1. A flame-retardant polyolefin-based rubber composition which comprises:
   (a) 100 parts by weight of a synthetic rubber of polyolefin type;
   (b) 1 to 50 parts by weight of an organopolysiloxane resin formed from monofunctional siloxane units represented by the formula $R_3SiO_{0.5}$, in which R is a hydrogen atom, a substituted or unsubstituted monovalent hydrocarbon group, and tetrafunctional siloxane units of the formula $SiO_2$ in a molar ratio in the range from 0.6/1.0 to 2.0/1.0;
   (c) from 1 to 20 parts by weight of red phosphorus; and
   (d) from 5 to 200 parts by weight of aluminum hydroxide or magnesium hydroxide.

2. The composition of claim 1 wherein the organopolysiloxane resin contains a flame-retardancy improving effective amount of functional groups which are reactive with the polyolefin-based synthetic rubber of component (a).

3. The composition of claim 2 wherein the functional groups are selected from the group consisting of hydrogen atoms directly bonded to the silicon atoms, vinyl, allyl, acrylic, methacrylic and mercaptopropyl.

* * * * *